Jan. 1, 1935.  J. H. ROETHEL  1,986,532
WINDOW REGULATOR
Filed March 7, 1932
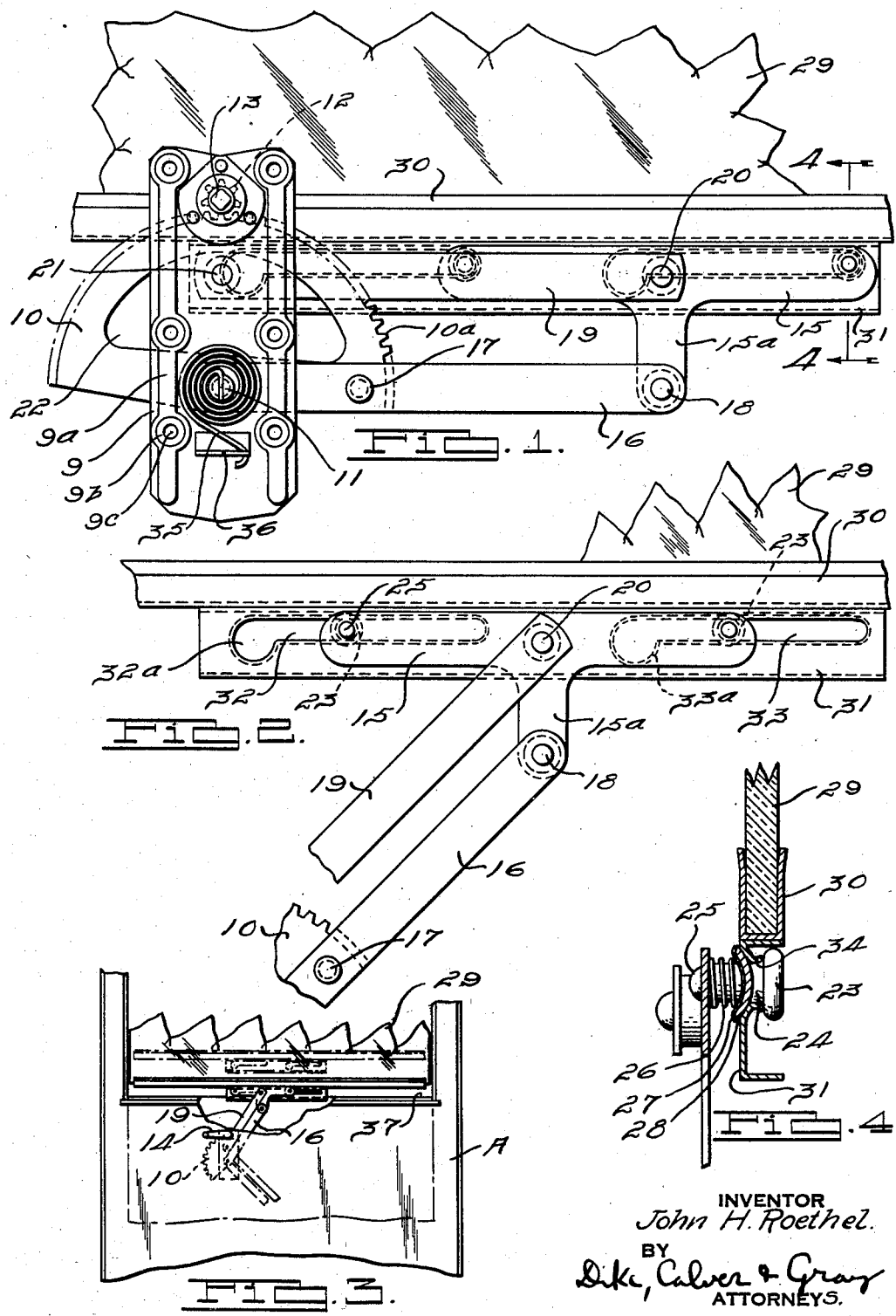
INVENTOR
John H. Roethel.
BY
Dike, Calver & Gray
ATTORNEYS.

Patented Jan. 1, 1935

1,986,532

UNITED STATES PATENT OFFICE 1,986,532

WINDOW REGULATOR

John H. Roethel, Detroit, Mich.

Application March 7, 1932, Serial No. 597,230

5 Claims. (Cl. 268—126)

This invention relates to regulators or controlling mechanisms for windows, particularly adapted for installation and use in the bodies or doors of automobiles, an object of the invention being to provide an improved and simplified construction for elevating and lowering the glass and which may be readily and easily assembled in production.

A further object of the invention is to provide an improved window regulating mechanism especially adapted for operating the window of an automobile body in which the window glass is supported and maintained against tilting or angular displacement, the construction being especially effective for use in connection with windows in which the glass has a slanting or inclined edge rendering it difficult to guide the opposite upright edges of the glass and maintain the glass in true vertical position.

A further object of the invention is to provide a construction, preferably embodying a pair of parallel swinging or oscillating arms and associated parts for raising and lowering the window glass, which will be more compact and have greater leverage strength, and in which the operating mechanism including the operator's handle may be placed a substantial distance lower within the body or door panel than heretofore, or the size of the gearing may be increased without undesirably disturbing the location, arrangement and operation of other parts.

Other objects of this invention will appear in the following description and appended claims, reference being had to the accompanying drawing forming a part of this specification wherein like reference characters designate corresponding parts in the several views.

Fig. 1 is a side elevation, illustrating a window regulating mechanism embodying the invention, illustrating an operating position of the parts.

Fig. 2 is a fragmentary side elevation illustrating another operating position of the regulator mechanism.

Fig. 3 is a fragmentary view illustrating a door or body portion of an automobile having a regulator, in accordance with the present invention, installed therein and illustrating a method of installation.

Fig. 4 is a section taken substantially on lines 4—4 of Fig. 1 in the direction of the arrows.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to the drawing wherein one embodiment of the invention is illustrated, by way of example, the apparatus includes a supporting plate 9 which is preferably embossed at 9a for reinforcement and is provided with suitable screw bosses 9b having holes 9c by means of which the plate may be secured, for example, within the body or door A of an automobile. The invention, however, is not limited to a support or plate of this design or form.

A gear sector 10 is secured to a rotatable stud 11 carried by the support 9, this gear having peripheral teeth 10a meshing with the teeth of a pinion 12 mounted on a stud 13 to which may be attached an operating crank handle 14 in position within the body of the car for manipulation by the operator. It will be understood that the crank 14 operates the pinion 12 and gear 10 through the medium of suitable releasable locking mechanism effective to hold the window in any adjusted position and prevent vertical displacement of the window except when the handle 14 is turned.

The lower edge of the window glass is supported at spaced points by means of a slide bar or member 15 provided with a downwardly extending projection or depending angular extension. An arm 16 is pivoted to the support 9 by means of the stud 11 and in the present instance is riveted at 17 to the gear 10. This arm, however, may be formed as an integral part of the gear 10, such as by punching out the gear and arm from the same metal blank. The arm 16 at its outer end is pivoted at 18 to the lower end of the extension 15a. Extending parallel to this arm is a second arm 19, the outer end of which is pivoted at 20 to the bar 15 at a point spaced above the pivot 18. The opposite end of the arm 19 is pivoted at 21 to the supporting plate 9. This may be accomplished by stamping or punching out an aperture 22 in the gear 10, or otherwise forming the gear with an opening within its area, and providing a projecting boss on the plate 9 to permit the arm 19 to overlap the gear and to be pivoted within the cutout or apertured portion 22 and, therefore, within the area of the gear. The boss on plate 9, which carries pivot 21, projects through the aperture 22 of the gear and provides a stop adapted to be engaged at the opposite ends of the aperture, when the gear is turned in opposite directions, to limit the up and down movement of the bar 15. The pivots 20 and 21 of the upper arm 19 are equidistant from the pivots 11 and 18 of the lower arm 16, so that when the arms are oscillated or swung they will move in parallel relation and will maintain the bar 15 in constant horizontal position against angular displacement.

In the present instance the bar 15 carries a pair of horizontally spaced devices or buttons 23 adapted to be connected to the window. Each button is in the form of an annular head at the end of a shank 24 which is riveted at 25 to the bar 15. Mounted on the cylindrical shank 24 is a compression spring 26 which acts against a convex shaped washer. This washer is shown as comprising a metal retaining portion 27 into which is fixed a washer 28 of nonmetallic material such as leather.

The window glass 29 is supported and retained at the lower edge thereof by means of a retaining member or channel structure which comprises in the present instance a channel 30 having spring walls which confine the lower edge of the glass. Secured along the lower edge of this channel, as by spot welding, is a channel guide 31 the vertical web of which is provided with longitudinally alined slots or openings 32 and 33. These slots terminate at their adjacent ends in enlarged openings 32a and 33a of a size to receive the buttons 23 and spaced apart a distance corresponding to the spacing of the buttons. The slots 32 and 33 provide guideways and in forming them the metal of the channel 31 is pressed or stamped to provide curved flanges 34 adapted to engage the shanks 24 and heads 23 of the devices and guide them in a horizontal path during the vertical movement of the window.

A suitable spiral spring 35 is provided for counterbalancing purposes, this spring having one end anchored to the stud 11 and the other end fastened to a projecting tongue 36 struck up from the metal of the supporting plate 9.

It will be seen that the window glass retaining member or channel structure together with the connecting bar 15 are cooperatively constructed so as to permit ready assembly of the buttons 23 into the guideways. Ordinarily in production of automobile bodies the operating mechanism of the window regulator, including the supporting plate 9, is first installed and attached within the body or door of the automobile, after which the glass carrying the channel structure 30, 31 is installed. The present construction enables the button devices 23 to be simultaneously inserted into the alined slots or guideways, since the bar 15 is always held in horizontal position, and hence the devices 23 are constantly alined with the horizontally extending guideways 32 and 33. With the regulator mechanism installed within the body panel, as shown in Fig. 3, the crank 14 is operated to elevate the bar 15 to its highest position in which it will project through or lie in close proximity to the slot at the upper edge of the window sill 37. The window glass, carrying the retaining channel at its lower edge, is placed within the window reveal so as to bring both of the slots 32 and 33 in alinement with the devices 23. With the bar 15 adjusted to its highest position the devices 23 will register with the openings 32a and 33a. By lowering the bar 15 the devices 23 will travel into the narrow slots 32 and 33, lowering the window glass sufficiently to permit the upper edge thereof to be set into the window opening. During normal operation of the window regulator, therefore, the buttons 23 will travel within the slots 32 and 33 but in their maximum travel the buttons will not reach the enlarged openings 32a and 33a so as to permit the parts to become disconnected.

It will be seen that by mounting the arm 19 above the arm 16 and pivoting it at 21 preferably within an apertured area of the gear 10 certain important advantages are secured. The arms may be shortened, thus increasing the leverage thereof and reducing the effort required to operate the window. Moreover, the position of the handle 14 may be lowered without requiring any increase in length of the arms, in fact shortening the arms and shortening their arc of swinging movement. If desired the size of the sector 10 may be materially increased, so as to secure easier operation, without however requiring either (1) the handle 14 and pinion 12 to be raised to accommodate the larger sector, or (2) the pivots of the arms 16 and 19 on the base plate to be lowered thereby necessitating a lengthening of the arms and resulting in undesirably changing both the arc of movement of the arms and the travel of the slide 15 in the glass channel. The construction is therefore advantageous in order to accommodate fixed clearances and permit mounting of the supporting plate without requiring changes in body construction.

I claim:

1. In a window regulator, a support, a pair of parallel swinging arms pivoted at their inner ends to the support, a member pivoted to the outer ends of the arms and adapted to be connected to the lower edge of a window, a gear for driving one of said arms and having an open area, said other arm being pivoted to the support within said area.

2. In a window regulator, a support, a pair of parallel swinging arms pivoted at their inner ends to the support, a member pivoted to the outer ends of the arms and adapted to be connected to the lower edge of a window, a gear for driving the lower of said arms and having an interior open area, the upper arm being pivoted to the support within said area.

3. In a window regulating mechanism of the class having a horizontally movable member adapted to be connected to a window for supporting the same at horizontally spaced points, a support, and a pair of parallel swinging arms pivoted at their outer ends to said member; a gear rotatably mounted on said support and operatively connected to one of said arms for swinging the same, said second arm being pivoted to the support within the area of the gear.

4. In a window regulator mechanism of the class having a horizontally movable member adapted to be connected to the lower edge of a window for supporting the same at horizontally spaced points, and a pair of parallel swinging arms pivoted at their outer ends to said member; a support, and a gear mounted on the support and having an interior cut-out area, one of said arms being fixed to said gear and the other of said arms being pivoted to the support within said cut-out area.

5. In a window regulator mechanism of the class having a pair of parallel swinging arms adapted to be connected at their outer ends to the lower edge of a window glass for raising and lowering the same; a support, and a gear rotatably mounted on the support for swinging the lower of said arms, the upper of said arms being pivoted to the support within the area of the gear and extending in overlapping relation to the gear.

JOHN H. ROETHEL.